US010709057B2

(12) United States Patent
Johnson et al.

(10) Patent No.: US 10,709,057 B2
(45) Date of Patent: Jul. 14, 2020

(54) SEED INDUCTOR BOX FOR AN AGRICULTURAL IMPLEMENT HAVING MULTIPLE AIR PATHS

(71) Applicant: CNH Industrial America LLC, New Holland, PA (US)

(72) Inventors: Chad M. Johnson, Arlington Heights, IL (US); Marvin A. Prickel, Homer Glen, IL (US); Grant T. MacDonald, Ames, IA (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/386,856

(22) Filed: Apr. 17, 2019

(65) Prior Publication Data

US 2019/0239423 A1 Aug. 8, 2019

Related U.S. Application Data

(62) Division of application No. 15/678,598, filed on Aug. 16, 2017, now Pat. No. 10,299,426, which is a division of application No. 15/049,958, filed on Feb. 22, 2016, now Pat. No. 9,750,177, which is a division of application No. 13/737,831, filed on Jan. 9, 2013, now Pat. No. 9,265,190.

(51) Int. Cl.
*B65G 53/14* (2006.01)
*A01C 7/08* (2006.01)

(52) U.S. Cl.
CPC .............. *A01C 7/082* (2013.01); *A01C 7/081* (2013.01)

(58) Field of Classification Search
CPC ........ B65G 53/12; B65G 53/14; B65G 53/50; A01C 7/081; A01C 7/082; A01C 7/084
USPC ......... 406/86, 90, 91, 94, 95, 117, 118, 119, 406/120, 121, 137, 138, 144, 146, 153; 111/174, 175, 176; 56/13.3, 13.4
See application file for complete search history.

(56) References Cited

U.S. PATENT DOCUMENTS

| 868,455 | A | | 10/1907 | Kretzer | |
|---|---|---|---|---|---|
| 1,053,412 | A | * | 2/1913 | Lob | B65G 53/521 406/95 |
| 1,736,969 | A | | 11/1929 | Greiser | |
| 2,021,171 | A | | 11/1935 | Buck | |
| 2,058,218 | A | * | 10/1936 | Duceini | B05B 7/1404 432/205 |
| 2,530,689 | A | | 11/1950 | Egger et al. | |
| 2,621,156 | A | | 12/1952 | Farrell | |
| 2,683,063 | A | * | 7/1954 | Malachick | B65G 53/06 406/93 |

(Continued)

*Primary Examiner* — Joseph A Dillon, Jr.
(74) *Attorney, Agent, or Firm* — Rebecca L. Henkel; Rickard K. DeMille (57) ABSTRACT

A particulate material delivery system for an agricultural implement includes an inductor box configured to receive particulate material from a tank. The inductor box includes an inductor segment comprising a particulate material supply chamber configured to guide the particulate material toward a fluidization chamber, and an air supply chamber configured to receive airflow from an airflow supply. The inductor box is configured to direct the airflow from the air supply chamber to the particulate material supply chamber through a first airflow path and through a second airflow path remote from the first air path.

6 Claims, 4 Drawing Sheets

(56) References Cited

U.S. PATENT DOCUMENTS

| | | | |
|---|---|---|---|
| 2,734,782 A * | 2/1956 | Galle | B65G 53/22 406/132 |
| 2,764,111 A | 9/1956 | Collins | |
| 2,861,527 A | 11/1958 | Phillips | |
| 2,874,999 A * | 2/1959 | Lofgren | B65G 53/20 406/95 |
| 2,919,159 A * | 12/1959 | Lacroix | B65G 53/00 406/137 |
| 2,919,160 A | 12/1959 | Blackburn | |
| 2,924,489 A * | 2/1960 | Beckmann | B65G 53/22 406/90 |
| 3,001,829 A * | 9/1961 | De Saint-Martin | B01J 8/0015 406/90 |
| 3,073,265 A | 1/1963 | Movilla et al. | |
| 3,149,884 A | 9/1964 | Jones | |
| 3,194,539 A | 7/1965 | Hanne-Wiame | |
| 3,206,255 A * | 9/1965 | Gray | B65G 53/00 406/93 |
| 3,345,111 A | 10/1967 | Bies et al. | |
| 3,425,601 A | 2/1969 | Fry | |
| 3,432,208 A * | 3/1969 | Draper | B65G 53/22 406/93 |
| 3,490,654 A | 1/1970 | Fischer | |
| 3,504,945 A * | 4/1970 | Leibundgut | B05B 7/1404 406/144 |
| 3,633,522 A | 1/1972 | Main | |
| 3,671,079 A * | 6/1972 | Smith | B65G 53/12 406/137 |
| 3,905,650 A * | 9/1975 | Freeman | B65G 53/12 406/94 |
| 4,060,181 A | 11/1977 | Grataloup | |
| 4,106,414 A | 8/1978 | Vastag | |
| 4,114,954 A * | 9/1978 | Pasieka | B65G 53/30 299/18 |
| 4,183,702 A * | 1/1980 | Bonnel | B65G 53/18 406/56 |
| 4,246,469 A | 1/1981 | Merlo | |
| 4,257,534 A | 3/1981 | Williams | |
| 4,280,419 A | 7/1981 | Fischer | |
| 4,296,695 A | 10/1981 | Quanbeck | |
| 4,367,685 A * | 1/1983 | Frame | F23K 3/02 110/263 |
| 4,381,898 A | 5/1983 | Rotolico et al. | |
| 4,453,866 A | 6/1984 | Ryan | |
| 4,502,819 A * | 3/1985 | Fujii | B65G 53/66 406/132 |
| 4,669,922 A | 6/1987 | Hooper et al. | |
| 4,718,574 A | 1/1988 | Schoenmaekers | |
| 4,729,514 A | 3/1988 | Ostrom et al. | |
| 4,758,119 A | 7/1988 | Frase et al. | |
| 4,779,765 A | 10/1988 | Neumeyer | |
| 4,824,295 A * | 4/1989 | Sharpless | B05B 7/1404 118/312 |
| 5,120,275 A * | 6/1992 | Zacharias | A01D 41/1243 460/111 |
| 5,133,270 A | 7/1992 | Ledermann et al. | |
| 5,145,293 A * | 9/1992 | Savino | B05B 7/1445 406/122 |
| 5,161,473 A | 11/1992 | Landphair et al. | |
| 5,238,154 A * | 8/1993 | Zuriel | B05B 7/1436 222/189.06 |
| 5,379,706 A | 1/1995 | Gage et al. | |
| 5,392,722 A | 2/1995 | Snipes et al. | |
| 5,402,741 A | 4/1995 | Truax et al. | |
| 5,494,381 A | 2/1996 | Heyl et al. | |
| 5,700,112 A * | 12/1997 | Lamm | B60P 3/224 406/124 |
| 5,826,523 A | 10/1998 | Gregor | |
| 5,915,312 A | 6/1999 | Meyer et al. | |
| 5,931,105 A | 8/1999 | Luxon | |
| 5,939,356 A | 8/1999 | Wellinghoff | |
| 5,947,040 A | 9/1999 | Gregor | |
| 5,979,343 A | 11/1999 | Gregor et al. | |
| 5,996,516 A | 12/1999 | Benneweis et al. | |
| 6,047,652 A | 4/2000 | Prairie et al. | |
| 6,079,911 A * | 6/2000 | Wangermann | A01M 7/0092 406/122 |
| 6,089,478 A | 7/2000 | Truan et al. | |
| 6,148,748 A | 11/2000 | Bardi et al. | |
| 6,164,222 A | 12/2000 | Mayerle et al. | |
| 6,192,813 B1 | 2/2001 | Memory et al. | |
| 6,213,690 B1 | 4/2001 | Gregor et al. | |
| 6,253,693 B1 | 7/2001 | Mayerle et al. | |
| 6,267,067 B1 | 7/2001 | Mayerle et al. | |
| 6,273,648 B1 | 8/2001 | Poncelet et al. | |
| 6,289,830 B2 | 9/2001 | Mayerle et al. | |
| 6,290,433 B2 | 9/2001 | Poncelet et al. | |
| 6,298,797 B1 | 10/2001 | Mayerle et al. | |
| 6,564,730 B2 | 5/2003 | Crabb et al. | |
| 6,595,148 B2 | 7/2003 | Meyer et al. | |
| 6,609,468 B1 | 8/2003 | Meyer et al. | |
| 6,644,225 B2 | 11/2003 | Keaton | |
| 6,666,156 B1 | 12/2003 | Mayerle et al. | |
| 6,668,738 B2 | 12/2003 | Lee et al. | |
| 6,675,728 B2 | 1/2004 | Lee et al. | |
| 6,688,244 B1 | 2/2004 | Meyer et al. | |
| 6,725,788 B2 | 4/2004 | McCartney et al. | |
| 6,776,108 B2 | 8/2004 | Crabb et al. | |
| 6,821,060 B2 | 11/2004 | McTurk et al. | |
| 6,883,445 B2 | 4/2005 | Mayerle | |
| 6,928,941 B1 | 8/2005 | Sternitzke | |
| 7,025,010 B2 | 4/2006 | Martin et al. | |
| 7,093,547 B2 | 8/2006 | Mayerle | |
| 7,144,204 B2 * | 12/2006 | Hilgraf | B65G 53/20 406/95 |
| 7,182,029 B2 | 2/2007 | Johnson et al. | |
| 7,213,525 B2 | 5/2007 | Meyer et al. | |
| 7,264,423 B2 | 9/2007 | Kowalchuk | |
| 7,267,061 B2 | 9/2007 | Mayerle | |
| 7,329,071 B2 * | 2/2008 | Sonnichsen | B65G 53/18 406/144 |
| 7,334,532 B2 | 2/2008 | Sauder et al. | |
| 7,353,760 B2 | 4/2008 | Mayerle et al. | |
| 7,413,387 B2 | 8/2008 | Pleyer | |
| 7,413,388 B2 * | 8/2008 | Krebs | B65G 53/08 406/120 |
| 7,462,002 B2 | 12/2008 | Mayerle | |
| 7,640,877 B1 | 1/2010 | Memory | |
| 7,647,875 B2 * | 1/2010 | Landphair | A01C 7/081 111/172 |
| 7,669,538 B2 | 3/2010 | Memory et al. | |
| 7,690,440 B2 * | 4/2010 | Dean | A01B 79/005 172/179 |
| 7,752,984 B2 | 7/2010 | Memory | |
| 7,779,769 B2 | 8/2010 | Memory | |
| 7,779,770 B2 | 8/2010 | Sauder et al. | |
| 7,806,061 B2 | 10/2010 | Memory | |
| 7,866,269 B2 | 1/2011 | Naylor et al. | |
| 8,033,230 B2 | 10/2011 | Naylor et al. | |
| 8,079,317 B2 | 12/2011 | Anderson et al. | |
| 8,234,987 B2 | 8/2012 | Georgison et al. | |
| 8,448,585 B2 | 5/2013 | Wilhelmi et al. | |
| 8,602,693 B2 | 12/2013 | Bligh et al. | |
| 8,905,681 B2 | 12/2014 | Schneider et al. | |
| 9,686,904 B2 * | 6/2017 | Roszman | A01C 7/081 |
| 2001/0013309 A1 | 8/2001 | Mayerle et al. | |
| 2001/0041103 A1 * | 11/2001 | Pfeiffer | B65G 53/14 406/144 |
| 2003/0177967 A1 | 9/2003 | Lee et al. | |
| 2004/0163578 A1 | 8/2004 | McDonald et al. | |
| 2004/0206283 A1 | 10/2004 | Mayerle | |
| 2006/0013659 A1 * | 1/2006 | Pfeiffer | B65G 53/14 406/106 |
| 2008/0018970 A1 | 1/2008 | Miyanagi et al. | |
| 2008/0105445 A1 | 5/2008 | Dayton et al. | |
| 2008/0295751 A1 | 12/2008 | Shoup et al. | |
| 2010/0017073 A1 | 1/2010 | Landphair | |
| 2010/0037807 A1 | 2/2010 | Henning et al. | |
| 2010/0326339 A1 | 12/2010 | Georgison et al. | |
| 2011/0162566 A1 | 7/2011 | Wlhelmi et al. | |
| 2011/0282556 A1 | 11/2011 | Klenz et al. | |

(56) References Cited

U.S. PATENT DOCUMENTS

| | | |
|---|---|---|
| 2012/0036914 A1* | 2/2012 | Landphair .............. A01C 7/081 73/1.16 |
| 2012/0042815 A1 | 2/2012 | Wonderlich |
| 2012/0174843 A1 | 7/2012 | Friggstad |
| 2012/0174844 A1 | 7/2012 | Friggstad |
| 2012/0272881 A1 | 11/2012 | Georgison et al. |
| 2014/0190378 A1 | 7/2014 | Johnson et al. |
| 2014/0190379 A1 | 7/2014 | Johnson et al. |
| 2014/0190380 A1 | 7/2014 | MacDonald et al. |
| 2014/0193211 A1 | 7/2014 | Connors et al. |
| 2014/0193213 A1 | 7/2014 | Johnson et al. |
| 2014/0193214 A1 | 7/2014 | Johnson et al. |
| 2014/0193215 A1 | 7/2014 | Connors et al. |
| 2014/0261116 A1 | 9/2014 | Redman et al. |

* cited by examiner

SEED INDUCTOR BOX FOR AN AGRICULTURAL IMPLEMENT HAVING MULTIPLE AIR PATHS

CROSS-REFERENCE TO RELATED APPLICATIONS

This patent application is a divisional of U.S. patent application Ser. No. 15/678,598, entitled "SEED INDUCTOR BOX FOR AN AGRICULTURAL IMPLEMENT HAVING MULTIPLE AIR PATHS", filed Aug. 16, 2017, which is a divisional of U.S. patent application Ser. No. 15/049,958, entitled "SEED INDUCTOR BOX FOR AN AGRICULTURAL IMPLEMENT HAVING MULTIPLE AIR PATHS", filed Feb. 22, 2016, now U.S. Pat. No. 9,750,177, which is a divisional of U.S. patent application Ser. No. 13/737,831, entitled "SEED INDUCTOR BOX FOR AN AGRICULTURAL IMPLEMENT HAVING MULTIPLE AIR PATHS", filed Jan. 9, 2013, now U.S. Pat. No. 9,265,190. Each of the above-referenced applications is herein incorporated by reference in its entirety.

BACKGROUND

The invention relates generally to ground working equipment, such as agricultural equipment, and more specifically, to an inductor box for a pneumatic distribution system of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

BRIEF DESCRIPTION

In one embodiment, a particulate material delivery system for an agricultural implement including, an inductor box configured to receive particulate material from a tank, the inductor box including, an inductor segment comprising a particulate material supply chamber configured to guide the particulate material toward a fluidization chamber, and an air supply chamber configured to receive airflow from an airflow supply, wherein the inductor box is configured to direct the airflow from the air supply chamber to the particulate material supply chamber through a first airflow path and through a second airflow path remote from the first air path In another embodiment, a particulate material delivery system for an agricultural implement including, an inductor box configured to receive particulate material, the inductor box including a housing, and an inductor segment disposed within the housing and comprising a particulate material supply chamber, the particulate material supply chamber configured to convey the particulate material with an airflow from a first airflow path and from a second airflow path, wherein the first and second airflow paths are remote from one another.

In a further embodiment, a particulate material delivery system for an agricultural implement including, an inductor segment comprising a particulate material supply chamber configured to receive and direct a particulate material from a particulate material tank, an upper airflow path configured to direct airflow from an airflow supply through a first screen from the air supply chamber, and into the particulate material supply chamber; and a lower airflow path configured to direct the airflow from the airflow supply through a second screen, and into the particulate material supply chamber.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
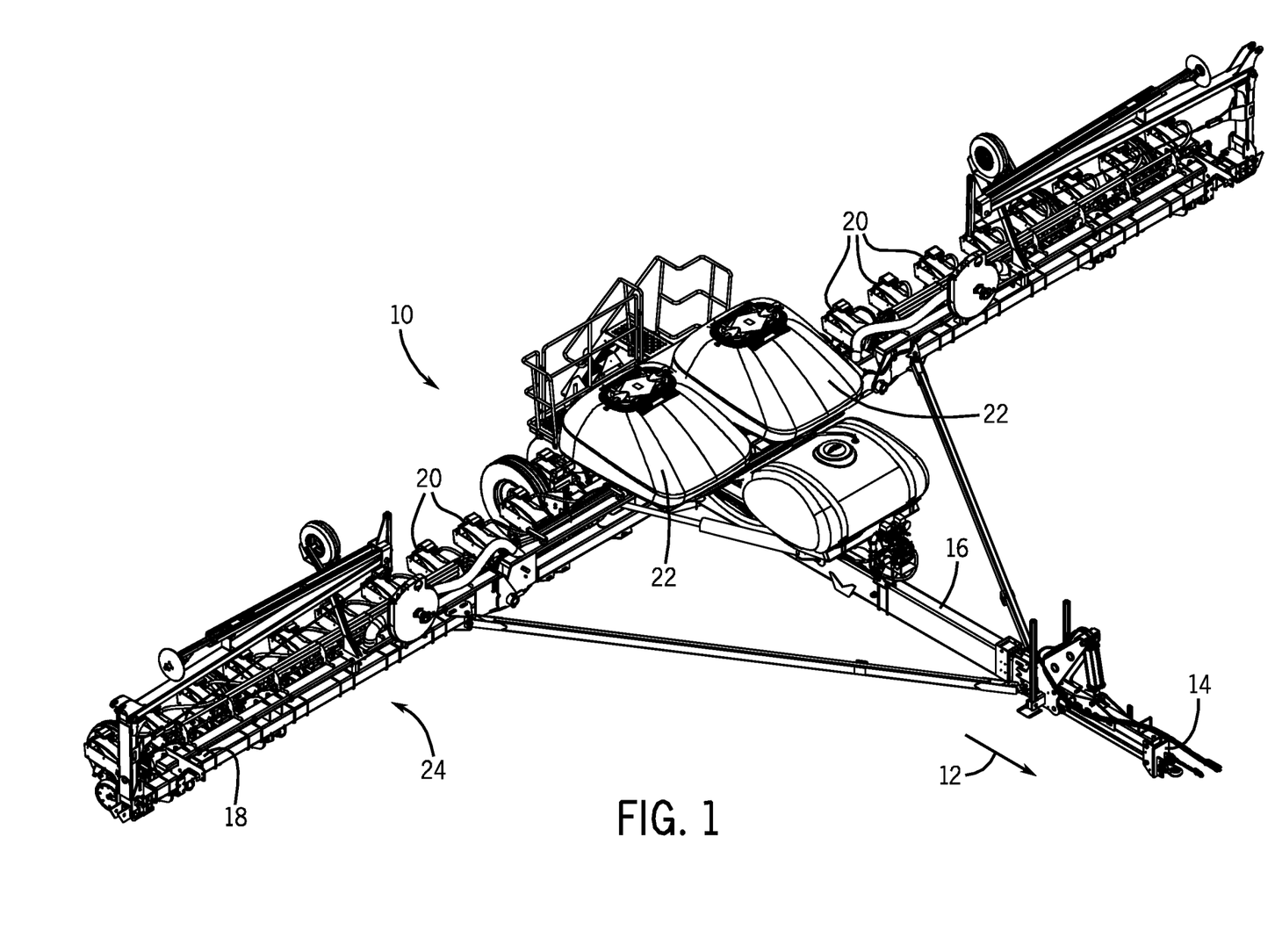
FIG. 1 is a perspective view of an embodiment of an agricultural implement configured to deposit particulate material into a soil surface.

FIG. 1 is a perspective view of an embodiment of an agricultural implement 10 configured to deposit particulate material into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit particulate material (e.g., seeds) at a desired depth beneath the soil surface, thereby establishing rows of planted seeds. The implement 10 also includes particulate material tanks 22, and a pneumatic distribution system 24 configured to convey particulate material from the tanks to the row units 20. In certain embodiments, the pneumatic distribution system includes an inductor box positioned beneath each particulate material tank 22. Each inductor box is configured to receive particulate material from a respective tank, to fluidize the particulate material into an air-particulate material mixture, and to distribute the air-particulate material mixture to the row units 20 via a network of pneumatic hoses/conduits (i.e., the pneumatic distribution system 24).

In certain embodiments, each row unit 20 includes a residue manager, an opening assembly, a particulate material tube, closing discs, and a press wheel. The residue manager includes a rotating wheel having multiple tillage points or fingers that break up crop residue, thereby preparing the soil for particulate material deposition. The opening assembly includes a gauge wheel and an opener disc. The gauge wheel may be positioned a vertical distance above the opener disc to establish a desired trench depth for particulate material deposition into the soil. As the row unit travels across a field, the opener disc excavates a trench into the soil for particulate material deposition. The particulate material tube, which may be positioned behind the opening assembly, directs a particulate material from a metering system into the excavated trench. The closing discs then direct the excavated soil into the trench to cover the planted particulate material. Finally, the press wheel packs the soil on top of the particulate material with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

As mentioned above, the pneumatic distribution system 24 includes an inductor box configured to receive particulate material (e.g., seeds) from a respective tank. Depending on the desired application, the pneumatic distribution system may distribute a wide variety of seeds (e.g., light seeds, heavy seeds, large seeds, small seeds, etc). The inductor box fluidizes the particulate material from a tank 22 into an air-particulate material mixture, for distribution to the row units 20 through a network of pneumatic hoses/conduits. More specifically, the inductor box includes multiple air pathways for directing airflow through the inductor box. As discussed in detail below the multiple air pathways enable the inductor box to fluidize light particulate material, to reduce updrafts, and to reduce backflow. As a result, the multiple pathways reduce maintenance costs/duration, increase reliability, and improve fluidization of different particulate material.

Figure 2:
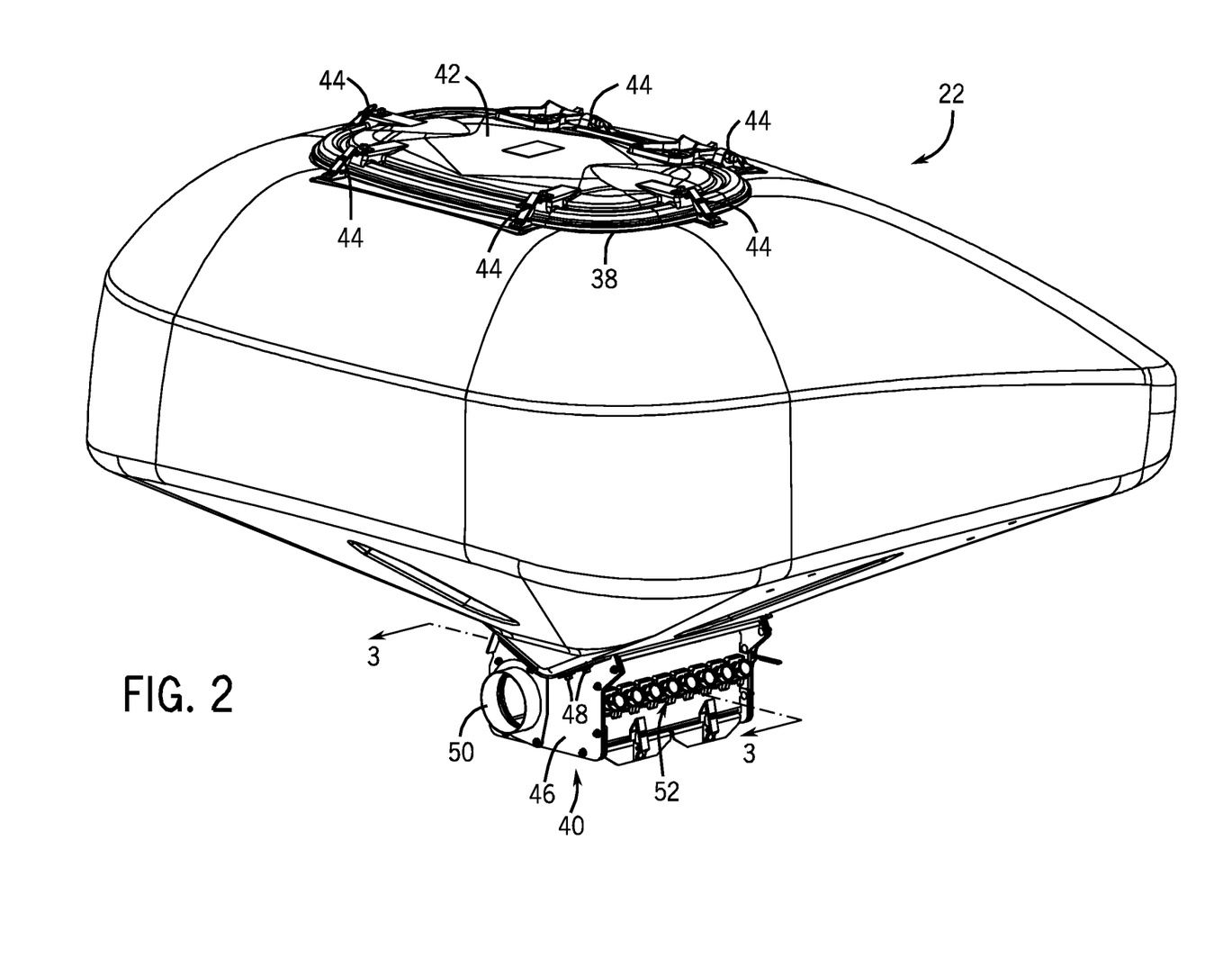
FIG. 2 is a perspective view of an embodiment of a particulate material tank coupled to an inductor box.

FIG. 2 is a perspective view of an embodiment of a particulate material tank 22 coupled to an inductor box 40. The particulate material tank 22 includes an opening 38 for receiving particulate material (e.g., seeds, etc.) for storage in the tank. The tank 22 secures the particulate material inside using a lid 42 that selectively covers the opening 38. The lid 42 securely attaches to the tank 22 with multiple fasteners 44. On the opposite side of the tank 22 from the lid is the inductor box 40. The inductor box 40 attaches to the bottom of tank 22 and receives gravity fed particulate material for fluidization. The inductor box 40 includes a housing 46 that is coupled to the tank 22 with bolts 48. Moreover, the inductor box 40 includes an air supply port 50, and multiple inductor segments 52. It is through the air supply port 50 that the inductor box 40 receives airflow from an air supply (e.g., a fan, a blower, etc.). The airflow from the air supply enables the inductor box 40 to fluidize the particulate material and to pressurize the tank 22. In some embodiments, the multiple inductor segments may not be surrounded by a housing 46. Instead, the multiple inductor segments 52 may be coupled together and to the tank 22. Furthermore, each of the inductor segments 52 may separately couple to an airflow supply or to an airflow supply manifold, instead of receiving airflow from an airflow supply chamber coupled to the air supply port 50. The tank 22 may be made of a flexible material that expands when pressurized with airflow from the air supply. As will be explained in greater detail below, the inductor box 40 directs airflow from the air supply through a series of air pathways to the inductor segments 52, and into the tank 22. The inductor segments 52 fluidize the particulate material with the airflow for delivery to the row units 20.

Figure 3:
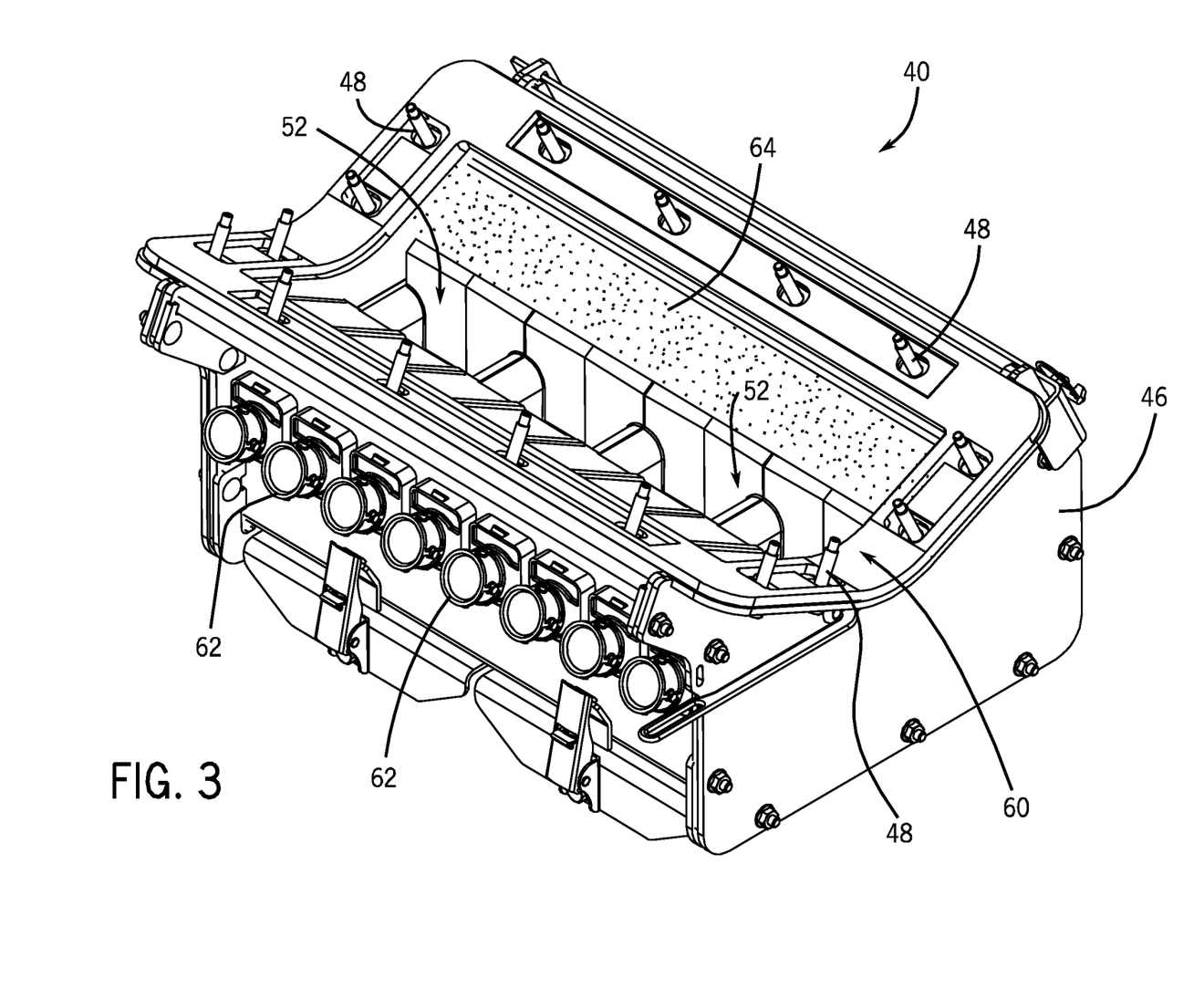
FIG. 3 is a perspective view of an embodiment of an inductor box.

FIG. 3 is a perspective view of an embodiment of an inductor box 40. As illustrated, the inductor box 40 includes multiple inductor segments 52 disposed within a chamber 60 formed by the inductor box housing 46. In the illustrated embodiment, there are eight inductor segments 52. However, other embodiments may include a different number of inductor segments 52 (e.g., 1, 2, 3, 4, 5, 6, 7, 8, 9, 10, or more). As mentioned above, the particulate material enters the inductor segments 52 from the tank where the particulate material is fluidized (i.e., mixed with air). Once the particulate material is fluidized, the air-particulate material mixture exits the inductor box 40 through particulate material delivery ports 62 in the inductor segments 52. The inductor box 40 includes a first screen 64 that is coupled to the inductor segments 52 and the housing 46. As will be explained in more detail below, the first screen 64 is disposed within an upper airflow path that facilitates light particulate material fluidization, reduces updrafts, and reduces backflow.

Figure 4:
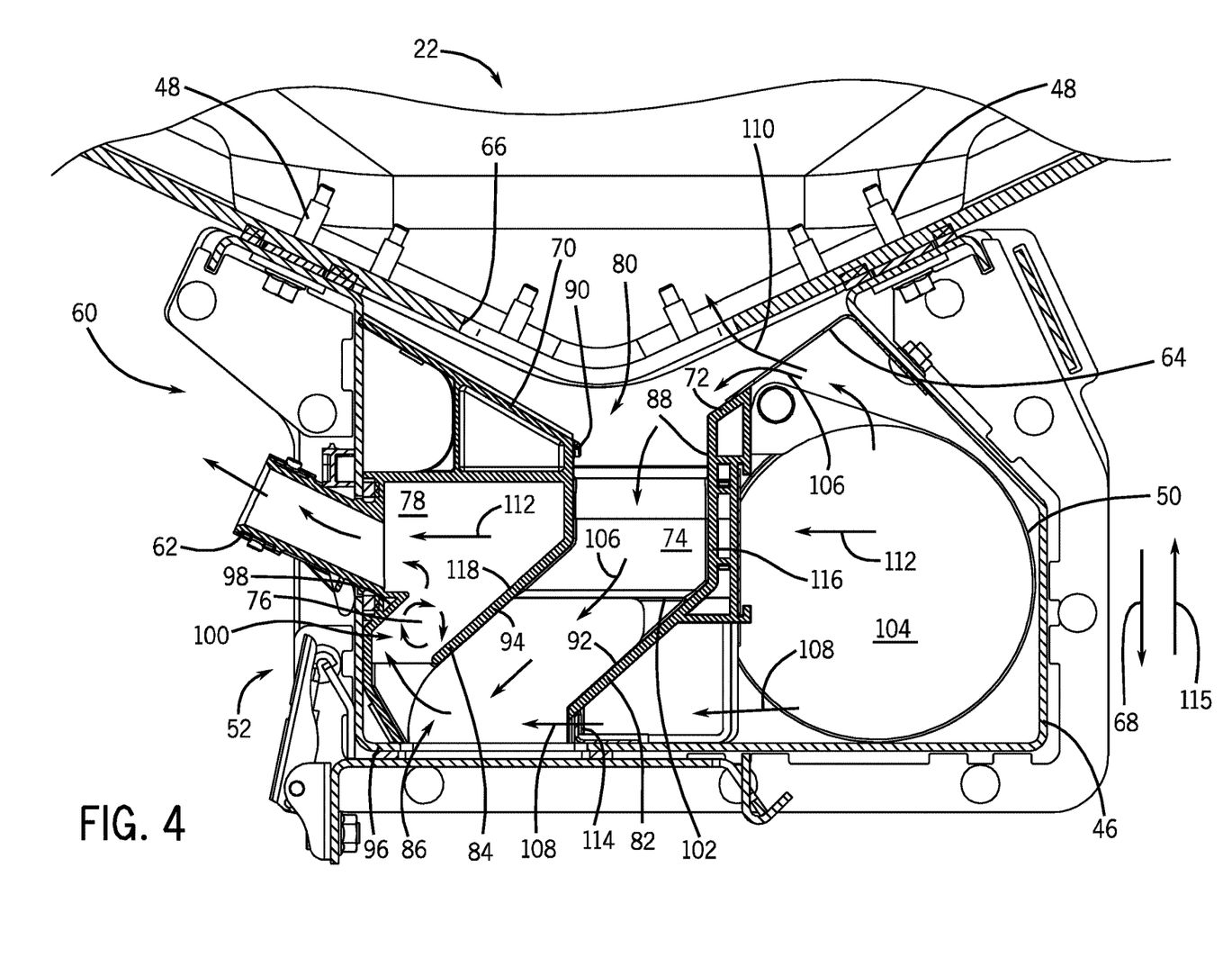
FIG. 4 is a cross-sectional side view of an embodiment of an inductor box.

FIG. 4 is a cross-sectional side view of an embodiment of an inductor box 40 coupled to the tank 22. As illustrated, the inductor box 40 is coupled to the tank 22 with bolts 48. The inductor box 40 surrounds a particulate material outlet(s) 66 of the tank 22, thereby enabling particulate material to exit the tank 22 and enter the inductor box 40. More specifically, as the particulate material exits the tank 22, in direction 68, the particulate material enters the inductor segment(s) 52. As explained above, the inductor box 40 includes an inductor segment 52 disposed within the inductor box chamber 60. The top of the inductor segment 52 includes two surfaces 70 and 72. The surfaces 70 and 72 may be angled to facilitate flow of particulate material into the inductor segment 52. As particulate material travels through the inductor segment 52, the particulate material passes through a series of chambers before exiting through the particulate material delivery port 62. The chambers in the inductor segment 52 include a particulate material supply chamber 74, a fluidization chamber 76, and a particulate material delivery chamber 78. The angled surfaces 70 and 72 channel the particulate material from the tank 22 into the particulate material supply chamber 74 through a particulate material supply chamber inlet 80. The particulate material supply chamber 74 guides the particulate material from the particulate material supply chamber inlet 80 to the particulate material supply chamber outlet 86 via a first wall 82 and a second wall 84. As illustrated, the walls 82 and 84 may include respective vertical portions 88 and 90, as well as respective angled portions 92 and 94. As the particulate material flows through the particulate material supply chamber 74, the angled portions 92 and 94 of the walls 82 and 84 direct the particulate material toward the particulate material supply chamber outlet 86 at a base 96 of the inductor box 40. Airflow from the air supply then conveys the particulate material through the particulate material supply chamber outlet 86 and into the fluidization chamber 76. The fluidization chamber 76 includes a first wall 98 and shares the second wall 84 of the particulate material supply chamber 74. If the air flow through the fluidization chamber is sufficient, the particulate material will fluidize and a vortex flow is created due to the geometry of the fluidization chamber 76. The vortex 100 separates and mixes the particulate material with the airflow before the particulate material flows to the particulate material delivery chamber 78. If the air flow through the fluidization chamber is sufficient the particulate material is conveyed out of the fluidization chamber 76 and into the particulate material delivery chamber 78. In the particulate material delivery chamber 78, airflow from the fluidization chamber combines with airflow from a bypass channel 102 to convey the particulate material out of the particulate material delivery chamber 78, through the particulate material delivery port 62, and to the row units 20.

As explained above, the inductor box 40 includes the air supply port 50 for receiving airflow from an air supply that pressurizes the tank 22 and conveys particulate material through the inductor segment 52. The airflow from the air supply passes through the air supply port 50 and enters an air supply chamber 104. The air supply chamber 104 extends through the inductor box 40 in a generally perpendicular direction to the flow path through the inductor segments 52, thereby supplying each inductor segment 52 with the airflow.

The air supply chamber 104 divides the airflow from the air supply into four airflow paths numbered 106, 108, 110, and 112. The first airflow path 106 passes through the first screen 64 and enters the particulate material supply chamber 74. As illustrated, the first screen 64 enables airflow to exit the air supply chamber 104, while simultaneously blocking particulate material from entering the air supply chamber 104, thus reducing maintenance costs and/or the duration of maintenance operations. As the airflow through the first airflow path 106 enters the particulate material supply chamber 74, the airflow engages the particulate material and urges the particulate material in direction 68. For example, when using light particulate material (e.g., sunflower seeds, sweet corn seeds), the airflow through airflow path 106 reduces blockage of the particulate material supply chamber 74 by providing additional force (in addition to gravity) to move the particulate material through the particulate material supply chamber 74. While the airflow through the first airflow path 106 facilitates urging the particulate material in the direction 68 through the particulate material supply chamber 74, the airflow through the second airflow path 108 conveys the particulate material out of the particulate material supply chamber 74 and into the fluidization chamber 76. The airflow through the second airflow path 108 flows through a second screen 114. The second screen 114 is coupled to the first wall 82 and the base 96 of the inductor box 40. The second screen 114, like the first screen 64, blocks the particulate material from entering the air supply chamber 104. Thus, the first screen 64 and the second screen 114 reduce maintenance costs/duration by blocking particulate material flow into the air supply chamber 104.

A third airflow path 110 flows through the first screen 64 and into the tank 22. The airflow in the third airflow path 110 pressurizes and expands the tank 22. However, in some embodiments, the lid 42 may not create a fluid tight seal with the tank 22. Accordingly, airflow in the third airflow path 110 may provide continuous airflow into the tank 22 to replace pressurized air lost through leaks in the lid 42. As a result, airflow from the first airflow path 106 is able to flow through the particulate material supply chamber 74, and the airflow in the second airflow path 108 is able to convey the particulate material into the fluidization chamber 76. In other words, the airflow in the third airflow path 110 pressurizes the tank 22, thus equalizing pressure within the system. As a result, backdrafts (i.e., airflow) from the second airflow path 108 into the tank 22 are substantially reduced or eliminated in direction 115. Moreover, the airflow through the third airflow path reduces or eliminates backflowing airflow through the inductor segment 52 when the air supply shuts down. As explained above, the airflow through the third airflow path 110 pressurizes and expands the tank 22. When the air supply shuts down the pressurized air from the tank 22 travels through the path of least resistance to escape the tank 22. In the present embodiment, airflow venting from the tank 22 passes through the first screen 64 and into the air supply chamber 104. As a result, the possibility of pressurized air in the tank 22 backflowing through the inductor segment 52 with particulate material, is substantially reduced in three ways. First, airflow through the first screen 64 may reduce or eliminate pressurized airflow from escaping through the second screen 114 and into the air supply chamber 104. Second, airflow through the first screen 64 may reduce or eliminate pressurized airflow carrying particulate material from passing through the particulate material supply chamber 74, the fluidization chamber 76, and the particulate material delivery chamber 78, before escaping through the air bypass channel 102 into the air supply chamber 104. Third, airflow through the first screen 64 may reduce or eliminate pressurized air from passing through the inductor segment 52 and exiting through the particulate material delivery port 62. Accordingly, the third airflow path 110 enables pressurized air to escape the tank 22, thus substantially reducing or eliminating fluidized particulate material from flowing through the inductor segment(s) 52.

The airflow in the fourth airflow path 112 flows from the air supply chamber 104 through the air bypass channel 102 and into the particulate material delivery chamber 78. The air bypass channel 102 is disposed within the particulate material supply chamber 74 and extends between the first particulate material supply chamber wall 82 and the second particulate material supply chamber wall 84. The walls 82 and 84 include respective apertures 116 and 118 that enable the airflow of the fourth airflow path 112 to pass through the air bypass channel 102. The air bypass channel 102 is oriented in a generally crosswise direction to the particulate material supply chamber inlet 80 and in a generally parallel direction to the particulate material supply chamber outlet 86. Moreover, the air bypass channel 102 is positioned above the fluidization chamber 76, thereby enabling the airflow from the fourth airflow path 112 to urge the particulate material exiting the fluidization chamber 76 into the particulate material delivery port 62 for delivery to the row units 20.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A particulate material delivery system for an agricultural implement comprising:
   an inductor segment which includes a housing which comprises a particulate material supply chamber configured to receive a particulate material from a particulate material tank;
   an upper airflow path configured to direct an airflow from an airflow supply into the particulate material supply chamber;
   a first screen positioned in an upper portion of the housing, wherein air moves through the first screen and particulate material moves over the first screen;
   a lower airflow path configured to direct the airflow from the airflow supply into the particulate material supply chamber; and
   a second screen positioned in a lower portion of the housing, wherein air moves through the second screen and particulate material moves over the second screen; wherein the particulate material supply chamber comprises an inlet and an outlet, the inlet is configured to receive the particulate material from the particulate material tank, the outlet is configured to expel the particulate material, and the inlet and the outlet of the particulate material supply chamber are substantially perpendicular to one another.

2. The particulate material delivery system of claim 1, further comprising a tank airflow path configured to direct the airflow from the airflow supply to the particulate material tank, and wherein the upper airflow path is non-parallel and non-perpendicular to the inlet of the particulate material supply chamber.

3. The particulate material delivery system of claim 1, wherein the inductor segment comprises a fluidization chamber configured to receive the particulate material from the particulate material supply chamber.

4. The particulate material delivery system of claim 1, wherein the upper airflow path and the lower airflow path are remote from one another.

5. The particulate material delivery system of claim 1, wherein the upper airflow path is configured to direct the airflow from the airflow supply into the particulate material supply chamber via the inlet.

6. The particulate material delivery system of claim 1, wherein at least a portion of the upper airflow path comprises a first airflow and a third airflow, both of which pass through the first screen, and wherein at least a portion of the lower air flow path comprises a second airflow and a fourth airflow, the second airflow passing through the second screen, and the fourth airflow passing through an air bypass channel and into the particulate material delivery chamber.

* * * * *